T. BROWN.
MANURE SPREADER.
APPLICATION FILED JAN. 6, 1915.
1,247,631.
Patented Nov. 27, 1917.
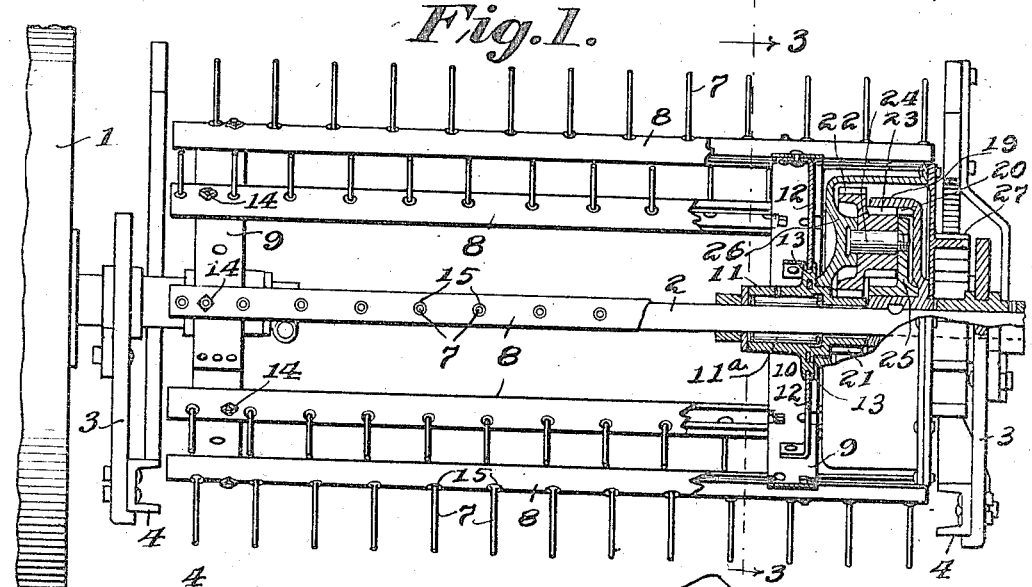
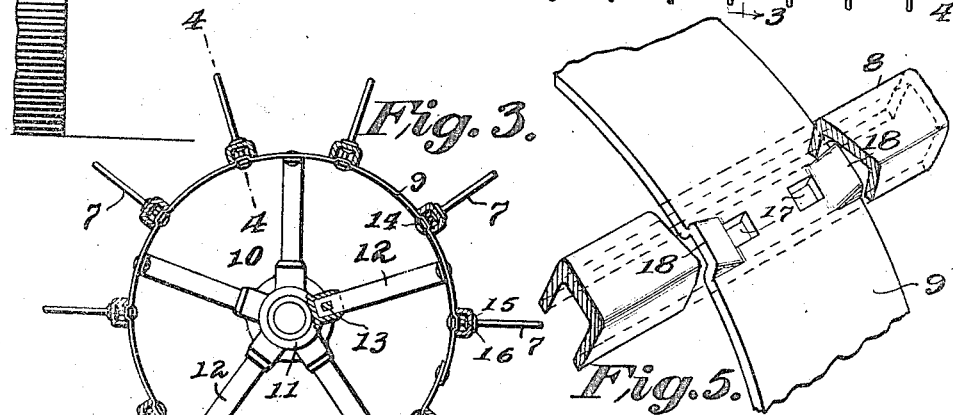
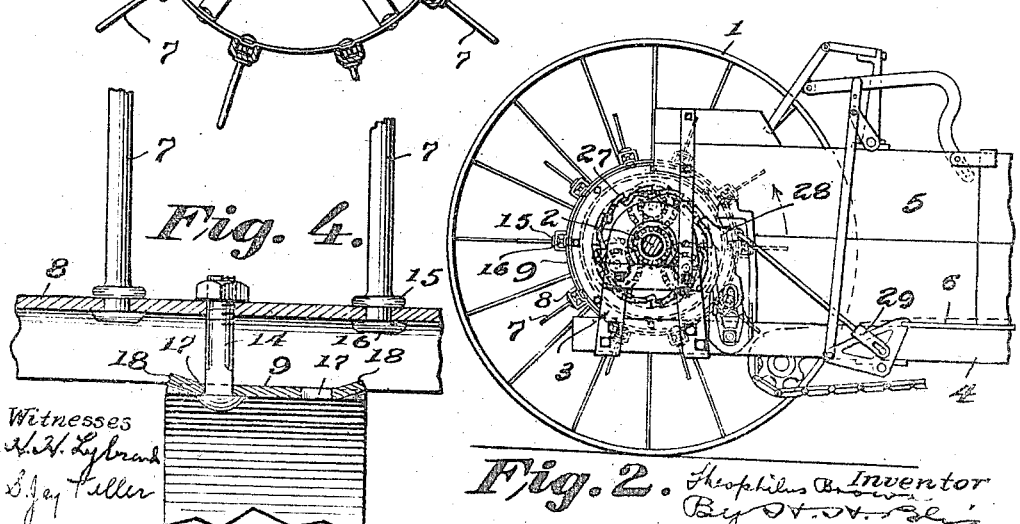
Witnesses
Inventor
Theophilus Brown
By his Attorney

UNITED STATES PATENT OFFICE.

THEOPHILUS BROWN, OF MOLINE, ILLINOIS, ASSIGNOR TO MARSEILLES COMPANY, OF EAST MOLINE, ILLINOIS, A CORPORATION OF ILLINOIS.

MANURE-SPREADER.

1,247,631.

Specification of Letters Patent.

Patented Nov. 27, 1917.

Application filed January 6, 1915. Serial No. 854.

*To all whom it may concern:*

Be it known that I, THEOPHILUS BROWN, a citizen of the United States, residing at Moline, in the county of Rock Island and State of Illinois, have invented certain new and useful Improvements in Manure-Spreaders, of which the following is a specification, reference being had therein to the accompanying drawing.

The invention relates especially to the rotatable beater which serves to engage the manure to pulverize and shred it and to throw it outward to be distributed over the ground. In the drawings I have shown some of the more important parts of a manure spreader of well known form in order that the relationship of the beater to the other closely associated parts may be fully understood. As concerns these other parts, however, there can be wide variation so far as the essential features of the invention are concerned.

The principal object of the invention is to provide in a manure spreader a rotating beater having improved structural features which enable it to be cheaply constructed, which give it great strength and rigidity together with light weight, and which have other important advantages as will fully appear from the following specification and claims.

In the accompanying drawings which illustrate a part of a spreader embodying my invention—

Figure 1 is a fragmentary transverse view partly in section and partly in elevation.

Fig. 2 is a side view of the rear part of the spreader, the right hand wheel being removed for the sake of clearness.

Fig. 3 is a sectional view of the beater detached from the other parts, the view being taken along the line 3—3 of Fig. 1.

Fig. 4 is a fragmentary sectional view on an enlarged scale taken along the line 4—4 of Fig. 3.

Fig. 5 is a fragmentary perspective view of a part of the beater structure.

In the drawings for the purpose of illustration I have shown a spreader which is similar in many respects to that shown in my Patent Reissue No. 13,318. In a spreader of this type the beater is mounted concentrically with the axle, but it will be understood that so far as my present invention is concerned the beater can be mounted in other positions.

In the construction as shown 1 represents the main rear wheels mounted at the ends of the transverse axle 2. Suspended from the axle 2 by means of the yokes 3, 3 are longitudinal main body supporting bars 4, 4, which can be supported at their front ends by means of dirigible wheels in the usual way. Mounted upon the bars 4 is a body made up of the side boards 5 and the rearward movable bottom 6. The bottom can be driven in any usual or preferred way, and as the driving means of itself constitutes no part of my present invention a showing thereof has been omitted.

A suitable support is provided for the beater, and this support as here shown is the above mentioned transverse axle 2. The beater is mounted on this support and comprises radial fingers 7 mounted on the longitudinal bars 8 which are carried by the two rings 9 preferably formed of sheet metal. These rings 9 are carried by spiders 10, which are mounted on the support, in this case the axle 2, and which are preferably rotatably mounted thereon independently of each other. Each spider has a hub 11 which is journaled on the axle preferably by means of roller bearings 11$^a$. Projecting radially outward from the hub 11 are spokes 12. These spokes are preferably formed of wrought bar metal and the hub is united to them preferably by casting. Each spoke 12 is formed with an aperture at 13 and the hub is cast with a flange which extends outward to surround the inner ends of the spokes, the metal of the flange extending through the apertures 13 thus firmly uniting the spokes with the hub. The outer ends of the spokes 12 are bent so as to lie parallel with the axis and are connected with the corresponding ring 9 preferably by riveting, as shown in Figs. 1 and 3.

The longitudinal bars 8 are preferably U-shaped in cross section with the open sides inward. These bars rest against the outsides of the rings 9, 9 and are held firmly in contact therewith by means of bolts 14, 14. The teeth 7, 7, extend radially outward and project through holes formed in the bars at regular intervals. Preferably as shown each tooth has a shoulder 15 engaging the outer side of the bar and is riveted over at 16 to engage the inner side of the bar. The teeth of each bar are offset with respect to those of the next so that the teeth of different rows will follow different circles of rotation. In order that the bolts 14 may be conveniently placed without interfering with the teeth each ring 9 is preferably provided with two sets of holes 17, 17, and the corresponding bolt 14 can be placed in either hole as may be most convenient on account of the positions of the adjacent teeth. By reference to Fig. 1, especially the left hand side, it will be observed that some of the bolts 14 are in the outer holes and others in the inner holes according to the positions of the teeth 7.

In order to firmly connect the rings 9, 9 and the bars 8, 8 and provide against any twisting or relative angular movements I form on the rings outward projecting bosses 18, 18 which extend into the spaces of the U-shaped bars 8 and engage the sides thereof. In order that the bosses 18, 18 may engage the bars at relatively widely separated points each ring 9 is made relatively wide as shown. The bosses 18, 18 taper outwardly in width, as shown in Fig. 5, so that they will certainly engage the sides of the bars 8 as the bars are drawn into their places by the bolts. In many cases the bars may be spread slightly by engagement with the diverging walls of the bosses. The bosses, thus firmly engaging the bars serve to hold them perpendicular with each of the rings 9, 9. Preferably the bosses 18, 18 are formed integrally with the rings 9, 9 by being pressed upward from the sheet metal of the rings themselves. It will be understood, however, that as concerns the formation of these bosses there can be variation.

For driving the beater I have shown a mechanism similar to that shown and described in my co-pending application for manure spreaders Ser. No. 693,430, filed April 26, 1912, but it will be understood that as concerns the details of the driving mechanism there can be wide variation. As shown, 19 is a drum keyed to the axle 2 and provided at 20 with an annular series of inward projecting gear teeth. 21 is a pinion connected to and preferably formed integrally with one of the hubs 11. 22 and 23 are two gear wheels connected together and preferably formed integrally and meshing respectively with the pinion 21 and with the gear 20. The gears 22 and 23 are rotatable about a pin 24 carried by the members 25 and 26 which are freely rotatable about the axis of the shaft being mounted respectively on the hub of the drum 19 and on the hub 11. The rotatable member 26 has connected with it a series of ratchet teeth 27 which are engageable by a pawl 28. By a suitable lever mechanism, such as that indicated at 29, the operator, from his position at the front of the spreader, can throw the pawl into or out of engagement with the ratchet teeth. When the pawl engages the teeth the members 26 and 25 are held against rotation and consequently the pin is held in fixed position. The gears 22 and 23 therefore rotate about a fixed axis and serve to transmit power from the axle to the hub 11 of the beater. When the pawl 28 is disengaged from the ratchet teeth 27 the members 26 and 25 are permitted to revolve and the gears 22 and 23 therefore simply roll about the pinion 21 without transmitting any power thereto.

A beater constructed in the way above described has great rigidity and is therefore well adapted for use in a spreader of any of the well-known forms. But it is especially advantageous in a construction such as that described, in which the two spiders are independently mounted on the support or axle and in which the power for rotating the beater is applied at one end only and must be transmitted to the other end through the longitudinal bars 8, 8.

Even with normal uniform working conditions, in a construction such as that shown, considerable power must be transmitted from one end of the beater to the other. Furthermore, the load on the beater is constantly and suddenly varying, as at one time the manure at one side of the spreader may be relatively heavy and dense and at the other end relatively light and porous, and then later these conditions may be suddenly reversed as another part of the load reaches the beater. The power to overcome this suddenly varying load must be transmitted through the bars 8, 8 with a resulting tendency to bend them and to move them angularly relatively to the rings 9, 9. But this tendency toward angular movement is resisted by the aforesaid bosses 18, 18 which engage the bars and prevent any movement of them relatively to the rings. The beater is also subjected to unusually heavy strains when it is first set into motion. The inertia of the beater itself together with that of the load is relatively great and the parts remote from the driving seat tend to lag behind. On this account great rigidity is desirable.

What I claim is:

1. The herein described supporting devices for the fingers of the beater of a manure spreader having, in combination, spaced spider rings supported from the axial bearings of the beater, each ring being formed of a wrought metal plate having its edges struck up to form outwardly extending bosses, a series of wrought metal channel bars extending longitudinally of the beater and having their sides tightly embracing the bosses, means supplemental to the bosses for securing the channel bars to the rings, each of the said channel bars having a longitudinal series of apertures, operating teeth seated in said apertures, and means disposed inside of the channel bars for securing the teeth thereto.

2. The herein described supporting devices for the fingers of a beater of a manure spreader having, in combination, a shaft, spaced wrought metal bands around the shaft each band having outwardly extending integral swaged bracing lugs or projections, a spider for each band comprising a cast hub and a series of radial wrought metal arms secured in the hub by casting and rigidly connected at their outer ends to the band, a series of transverse wrought metal U-channel bars each having its flanges resting upon the bands and having bracing engagement with said lugs or projections, a series of operative fingers inserted in the channel bar, and finger-securing devices arranged in the channel bar and engaging respectively with the said fingers.

3. In a beater for manure spreaders, the combination of a series of longitudinal finger bars, radial fingers carried by the bars, those on one bar being staggered relatively to those on adjacent bars, a plurality of broad widely spaced bar engaging rings supported from the axial bearings of the beater and each having two circumferential rows of apertures therein, and bolts connecting the bars to the rings, some of the bolts for each ring extending through the holes of one row and some through the holes of the other row in accordance with the positions of the fingers on the corresponding bars.

In testimony whereof, I affix my signature, in presence of two witnesses.

THEOPHILUS BROWN.

Witnesses:
W. B. McMahin,
Geo. E. Bartholomew.

Copies of this patent may be obtained for five cents each, by addressing the "Commissioner of Patents, Washington, D. C."